United States Patent
Ritter et al.

(10) Patent No.: US 7,553,081 B2
(45) Date of Patent: Jun. 30, 2009

(54) X-RAY SYSTEM AND CALIBRATION METHOD THEREFOR

(75) Inventors: Dieter Ritter, Fürth (DE); Christian Schmidgunst, Straubing (DE)

(73) Assignee: Siemens Aktiengesellschaft, Munich (DE)

( * ) Notice: Subject to any disclaimer, the term of this patent is extended or adjusted under 35 U.S.C. 154(b) by 68 days.

(21) Appl. No.: 11/861,416

(22) Filed: Sep. 26, 2007

(65) Prior Publication Data

US 2008/0075349 A1    Mar. 27, 2008

(30) Foreign Application Priority Data

Sep. 26, 2006   (DE) ...................... 10 2006 045 425

(51) Int. Cl.
*G01D 18/00* (2006.01)
(52) U.S. Cl. ..................................... 378/207; 378/98.8
(58) Field of Classification Search ................ 378/98.7, 378/98.8, 98.12, 207; 250/370.09
See application file for complete search history.

(56) References Cited

U.S. PATENT DOCUMENTS 7,381,964 B1 *  6/2008  Kump et al. ........... 250/370.11

2007/0065038 A1    3/2007  Maschauer et al.

FOREIGN PATENT DOCUMENTS

DE          103 443 496          5/2005

* cited by examiner

*Primary Examiner*—Edward J Glick
*Assistant Examiner*—Mona M Sanei
(74) *Attorney, Agent, or Firm*—Schiff Hardin LLP

(57) ABSTRACT

In a method for calibration of an image-generating x-ray system with a digital x-ray receiver and an x-ray system operating with this calibration method, a number of first offset-corrected bright images are determined at a first constant reference temperature of the x-ray receiver respective at a number first dose settings. A second offset-corrected bright image are subsequently determined at a number of second reference temperatures and at second dose settings that correspond to respective first dose settings. A quotient image is calculated from the second bright image and the first bright image for each of these reference temperatures and is stored. A multi-point calibration at various reference temperatures is implemented with low time expenditure in this manner.

8 Claims, 4 Drawing Sheets

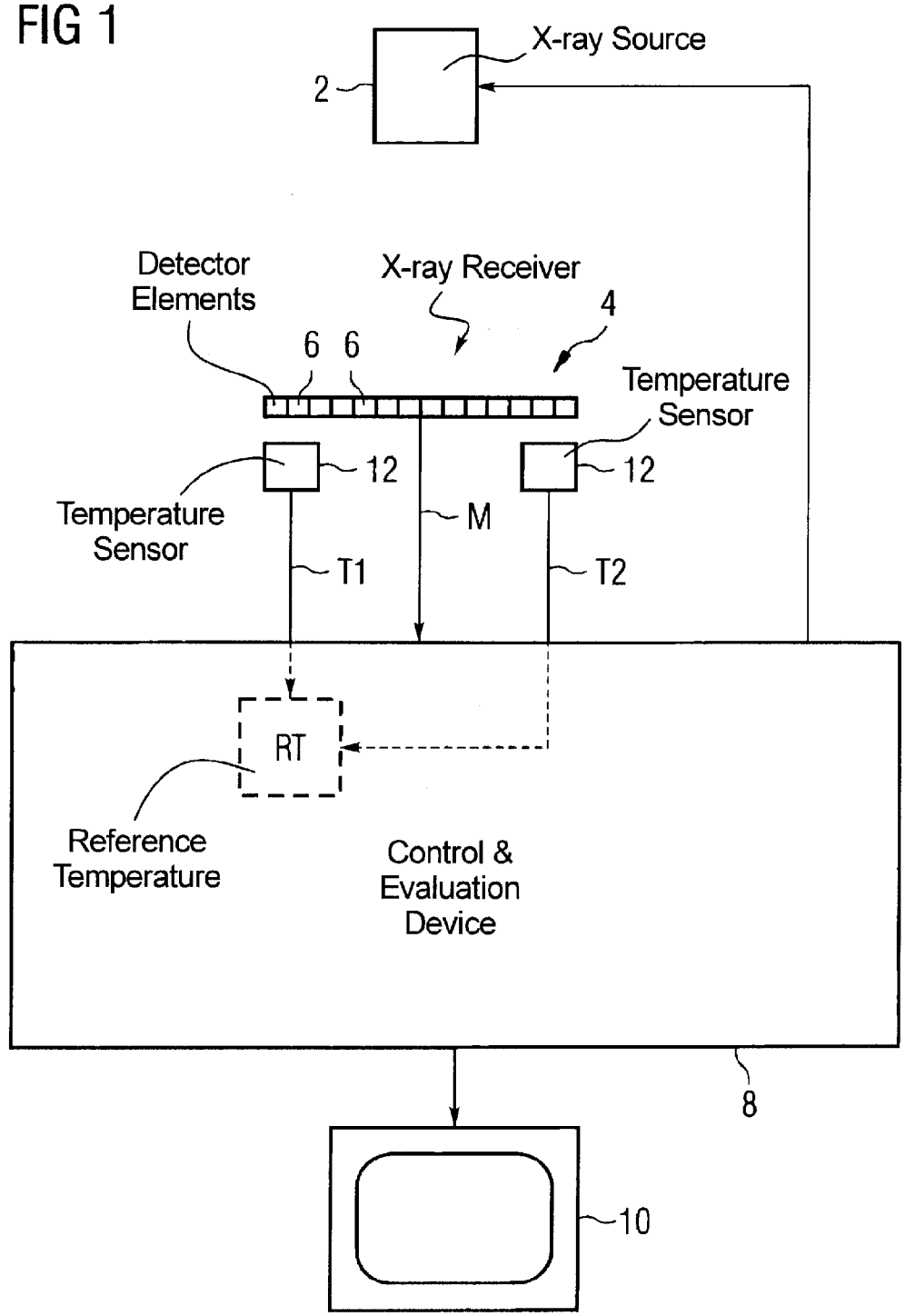

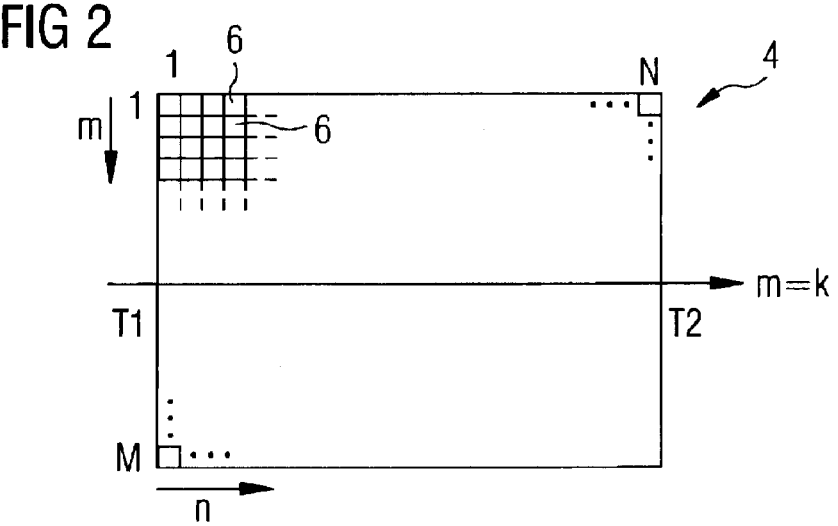
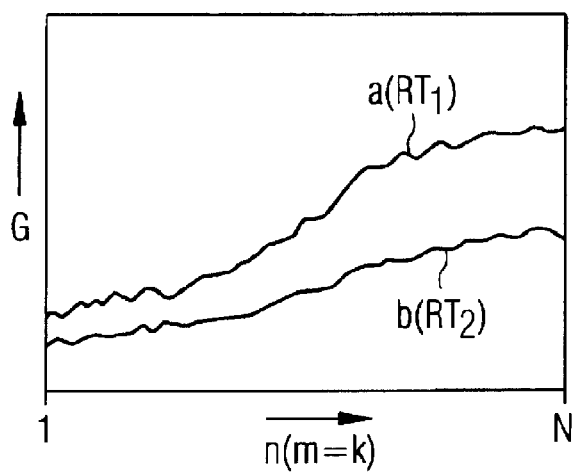
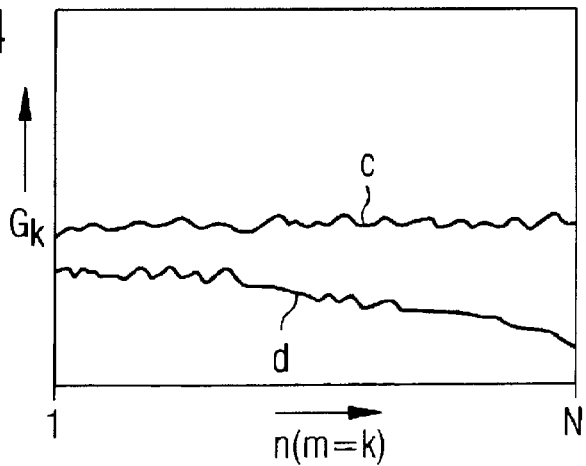

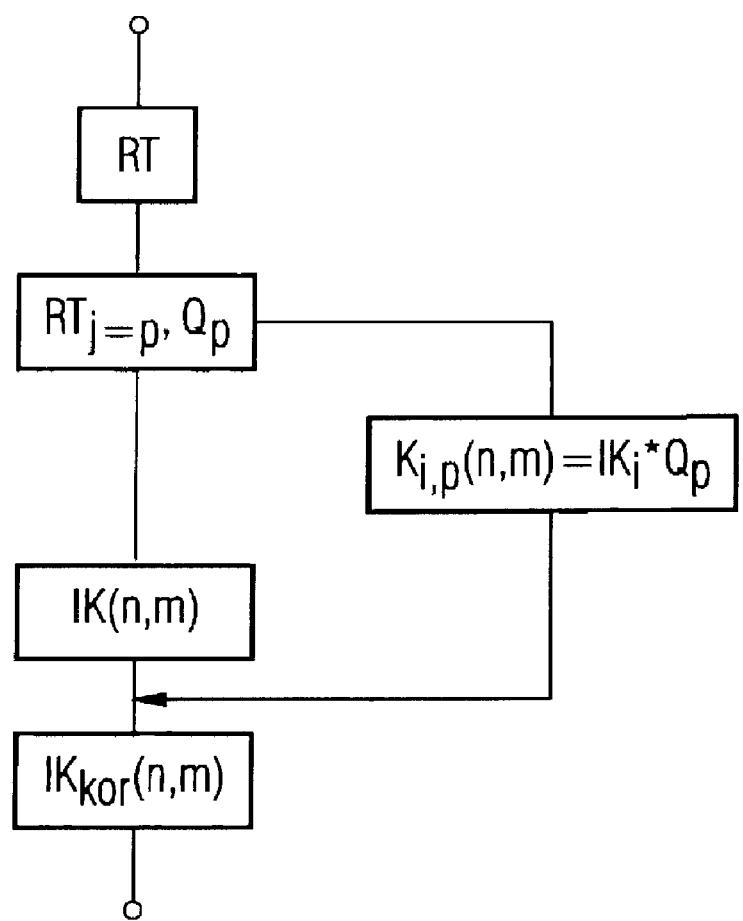

X-RAY SYSTEM AND CALIBRATION METHOD THEREFOR

BACKGROUND OF THE INVENTION

1. Field of the Invention

The present invention concerns a method for calibration of an image-generating x-ray system with a digital x-ray receiver. The invention moreover concerns a method for generation of an x-ray image with an x-ray system calibrated according to such a method as well as an x-ray system operating according to such a method.

2. Description of the Prior Art

The digitized measurement signals (known as raw image data or raw images) generated from the detector elements of a digital x-ray receiver (which detector elements are arranged in a two-dimensional array) must be post-processed and corrected in an image processing device for reproduction of the x-ray image on a reproduction medium that is suitable for use by a radiologist from a diagnostic standpoint. In this post-processing, both the dark current component (offset) and the sensitivity (gain) must be taken into account and corrected for every single detector element.

The sensitivity of the detector elements is thereby normally not constant over the entire relevant dose range (dynamic range), i.e. the range of the dose settings with which the x-ray system can be operated, such that a calibration must be made for a number of dose settings (i.e. a number of values of the current (anode current) flowing to the anode in the x-ray tube given a constant x-ray voltage (constant x-ray spectrum), in order to achieve a linear response of the detector elements of the digital x-ray receiver to the incident x-ray radiation.

By means of such a multi-point calibration, it is ensured that a homogeneously exposed x-ray image (bright image) is always provided by the x-ray receiver at each dose setting in the absence of a subject, except for the quantum and electronic noise.

This calibration, however, is only exactly valid for a constant temperature. If a temperature difference exists between the point in time of the calibration (which normally is implemented after the expiration of a warm-up phase) and the point in time of the actual image acquisition (which, for example, is effected shortly after activation of the x-ray system), an error results for each detector element that is specific to this detector element, since its sensitivity no longer coincides with the sensitivity that it had during the calibration. These differences lead to artifacts in a two-dimensional x-ray image or in a three-dimensional reconstruction. In the case of a two-dimensional image, an intensity gradient results primarily in the direction of an image coordinate. Line artifacts that become noticeable as a radial intensity gradient and ring artifacts occur in a 3D reconstruction.

In principle it would now be possible to take this temperature dependency of the sensitivity of the individual detector elements into account by a calibration at different temperature ratios being done at regular time intervals in the environment of the x-ray receiver, and storing the determined data in a memory.

A number of temperature sensors is arranged in the environment of the x-ray receiver to determine respective existing temperature ratios. A characteristic current reference temperature representative of the current temperature ratios in the x-ray receiver is formed from the temperatures measured at various measurement points. These temperatures normally are not the same over the entire area (surface) of the x-ray receiver, but rather can exhibit a significant difference caused by electrical components arranged in the environment of the x-ray receiver.

If a series of x-ray images were then acquired during a warm-up phase, using the respectively determined current reference temperature could be checked whether a calibration exists for these images.

In practice, however, a multi-point calibration for a number of reference temperatures is nearly impossible because the total duration of the calibration also increases with the increasing number of the measurement points (dose settings) used for the calibration at a reference temperature.

In order to be able to calibrate exactly, a waiting time on the order of 5 to 10 minutes must elapse between the individual dose settings in order to reduce interference effects (such as, for example, persisting luminescence).

The pure measurement time for a ten-point calibration, for example, thus lasts at least one hour. During this time a constant reference temperature of the x-ray receiver cannot be assumed, such that in principle the heating procedure must be reproducibly repeated for every dose setting. Given a heating or cooling phase of approximately four hours that is necessary for this, only one dose setting per day could be accommodated. A ten-point calibration that takes into account the temperature effects would thus take up 10 days. Such a calibration cannot be implemented in practice.

SUMMARY OF THE INVENTION

An object of the present invention is to provide a method for calibration of an image-generating x-ray system with a digital x-ray receiver that receives the x-ray radiation, with which a multi-point calibration with justifiable effort is possible for different temperatures. A further object of the invention is to provide a method for generation of an x-ray image with an x-ray system that is calibrated with such a method. A further object is to provide an x-ray system operating according to such a method.

The first object is achieved according to the invention is achieved by a method for calibration of an image-generating x-ray system with a digital x-ray receiver that receives the x-ray radiation from an x-ray tube, wherein (a) a first dark raw image at a first, constant reference temperature of the x-ray receiver is generated, (b) a first bright raw image is generated for a number of first dose settings at this first reference temperature, (c) a number of first offset-corrected bright images are determined from the dark raw image and the first bright raw image, (d) a second dark raw image is generated at a number of second reference temperatures, (e) a second bright raw image is generated at these second reference temperatures for a second dose setting that corresponds to one of the first dose settings, (f) an offset-corrected second bright image is determined from the second dark raw image and the second bright raw image for each of these second reference temperatures, (g) for each of these reference temperatures, quotient images are determined from the second bright image and the first bright image belonging to the second dose setting, and (h) the quotient images and the reference temperatures belonging thereto are stored.

The method steps (a)-(c) correspond to a multi-point calibration at the first reference temperature while the method steps (d)-(h) correspond to a temperature calibration for the second dose setting.

The invention is based on the insight that the quotient images generated in this manner are independent of the dose setting with which the second bright images have been generated. In other words, if quotient images are calculated at the same reference temperatures but with two bright images that have been generated with a different second dose setting, these quotient images do not differ, or at most differ slightly, from the quotient images generated with the preceding second dose setting. By multiplication of the first bright image generated for (for example) L different first dose settings with (for example) quotient images generated for K reference temperatures, an image data set composed of L×K calibration images can be provided. These can either already be calculated and stored after the determination of the quotient images.

If the calculation of the calibration images ensues only when an x-ray image of a subject must be generated with the x-ray system at a current reference temperature (and thus only the calibration images belonging to the current reference temperature must be stored), the storage space requirement is significantly reduced since only the quotient images are permanently stored.

When the dark raw images and the second bright raw images are generated during the heating phase of the x-ray system, a particularly time-efficient calibration of the x-ray system is achieved.

When the first and second bright raw images and the first and second dark raw images are respectively averaged bright raw images or, respectively, dark raw images formed from a number of bright raw images or, respectively, dark raw images, random image errors are reduced.

The second object is achieved according to the invention by a method as described above with the following additional steps: (a) determining of a current reference temperature of the x-ray receiver, (b) selecting of the calibration images belonging to the current reference temperature, (c) generating of an offset-corrected bright image of an examination subject for a current dose setting and the current reference temperature, and (d) correcting the offset-corrected bright image with the current calibration images.

As an alternative, the respectively required current calibration images can also first be calculated for the x-ray image generation by the quotient image belonging to the current reference temperature initially being selected and the necessary current calibration images being subsequently generated by multiplication of the first bright images with this quotient image. The storage space necessary for the calibration images is thereby reduced.

The above object is also achieved in accordance with the present invention by an x-ray system operating according to the method described above, including all embodiments thereof.

BRIEF DESCRIPTION OF THE DRAWINGS

FIG. 1 schematically illustrates an x-ray system according to the invention.

FIG. 2 is a schematic plan view of a digital x-ray receiver.

FIG. 3 is a diagram in which the sensitivity of the detector elements of one line is plotted against the line number.

FIG. 4 shows a diagram as in FIG. 3 for a bright image, that has been corrected using the diagram of FIG. 3.

FIG. 6 is a flowchart showing the correction of an x-ray image with the use of the patient images generated with calibration according to the invention.

DESCRIPTION OF THE PREFERRED EMBODIMENTS

Figure 5:
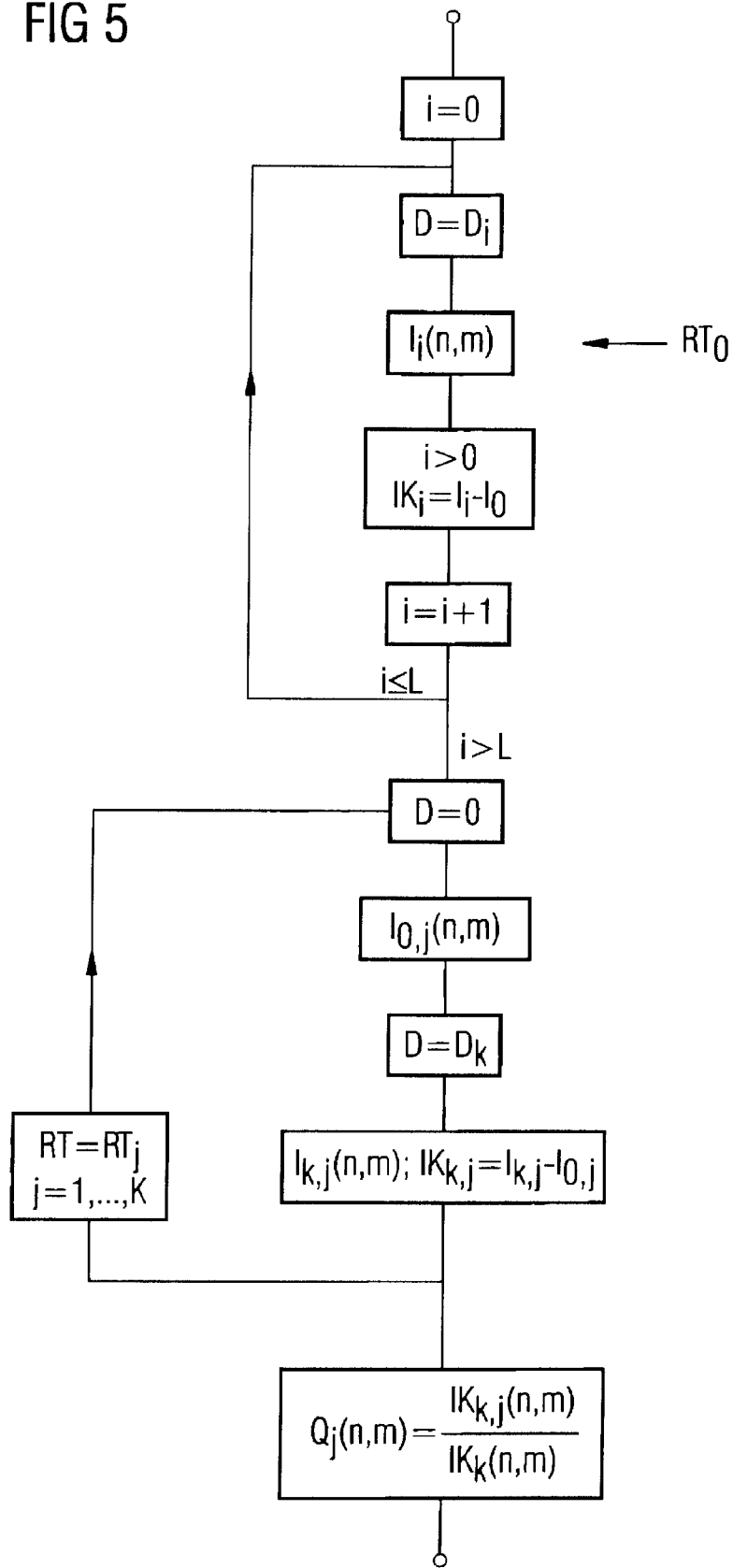
FIG. 5 is a flowchart in which the workflow of a calibration according to the invention is illustrated.

As shown in FIG. 1, the x-ray system has an x-ray source 2 as well as a digital x-ray receiver 4 having a number of detector elements 6 arranged like a matrix. X-ray source 2 and x-ray receiver 4 are connected to a central control and evaluation device 8 with which these components are controlled and the measurement signals received from the x-ray receiver 4 are evaluated. With hardware and software implemented in the control and evaluation device 8, the x-ray system can operate according to the subsequently explained method and a corrected x-ray image (correction image) that can be presented on a monitor 10 is generated.

A number of temperature sensors 12, with which the temperature distribution within the environment of the x-ray receiver 4 is measured, are arranged in the environment of the x-ray receiver 4. A reference temperature RT is determined from the temperatures T1 and T2 measured by the temperature sensors 12, of which only two are representatively drawn in FIG. 1 for clarity. It is assumed that each reference temperature RT corresponds to a fixed temperature distribution at the x-ray receiver 4.

In an exemplary embodiment the x-ray receiver 4 is in a plan view in FIG. 2. It has N×M pixels or detector elements 6 that are arranged in a plane. A temperature gradient (illustrated in the example as a simple temperature gradient from left to right with T1>T2) arises across the x-ray receiver 4 during the operation.

In FIG. 3 the sensitivity of the detector elements is plotted for the line m=k with the column numbers 1 through N for different reference temperatures $RT_1$ and $RT_2$. Practically continuous curves result in the representation due to the large number of detector elements. Sensitivity curve $a(RT_1)$ is associated with a low reference temperature $RT_1$ as occurs during the heating phase after start-up, thus before reaching a stable operating temperature.

It can be seen from FIG. 3 that the sensitivity (gain) G significantly increases from left to right. This is a result of the temperature gradient T1>T2 building after start-up and the sensitivity G of the detector elements that decreases with increasing temperature.

Curve $b(RT_2)$ shows a situation as occurs after longer operating period when the reference temperature $RT_2$ has risen further due to the loss heat generated within the x-ray system. It can be clearly seen that both the sensitivity of each of the detector elements 1 through N and the variation of the sensitivity G is reduced with increasing reference temperature RT. In other words: the difference of the sensitivity G between the detector element (1, k) and the detector element (N, k) is significantly greater at low reference temperatures RT (curve $a(RT_1)$) than at greater reference temperatures RT (curve $b(RT_2)$).

FIG. 4 shows in curve c as occurs when a bright raw image (x-ray image in the absence of a subject) is acquired with the x-ray system at a reference temperature $RT=RT_1$ and is corrected with the sensitivity curve a of FIG. 3 that belongs to the same reference temperature $RT_1$.

In this case an image results that is practically homogeneous except for the quantum and electronic noise, as is illustrated by a horizontal, only slightly noisy line c in the one-dimensional representation of FIG. 4. If such a bright raw image is now acquired at the reference temperature $RT_2$ and corrected with the sensitivity values (belonging to the reference temperature $RT_1$) of the individual detector elements (n, m), a significant gradient from left to right results.

The corrected bright image is either too dark (when the sensitivities measured at the reference temperature $RT_1$ (FIG. 3, curve $a(RT_1)$) are used, as is shown in FIG. 4, curve d) or too bright (when the sensitivity of the detector elements at a higher reference temperature $RT_2$ (FIG. 3, curve $b(RT_2)$) is used for calibration). Moreover, a gradient arises in the bright image that become noticeable in the form of stripes in a 2D representation and would lead to ring artifacts in a 3D reconstruction.

According to FIG. 5, in a first step the x-ray system is operated at a constant reference temperature $RT_0$ (for example, as is set after a longer operating period (for example approximately 4 hours) given constant environment temperature) at different dose settings $D=D_i$, $i=0, 1, \ldots, L$. A first dark raw image $I_0(n, m)$ is initially generated with the dose setting $D_0=0$. A bright raw image $I_0(n, m)x$, $i=1, \ldots, L$ is now generated for each of L predetermined dose settings $D_1, \ldots, D_L>0$ differing from 0. Bright images $IK_i=I_i-I_0$ that are offset-corrected at this first reference temperature $RT_0$ are now calculated by difference formation from the first dark raw image $I_0$ and the respective first bright raw images $I_i$ ($1 \leq i \leq L$). This method corresponds to the multi-point calibration described above.

Given a number K of reference temperatures $RT_j$, $j=1, \ldots, K$, for example during the heating phase upon start-up of the x-ray system after a longer downtime, two dark raw images $I_{0,j}(n, m)$ (dose setting D=0) as well as bright raw images $I_{k,j}$ are now generated for a dose setting $D=D_k$ which corresponds to one of the first dose settings $D_i$, with i=k. An offset-corrected second bright image $IK_{k,j}=I_{k,j}-I_{0,j}$ for each of these reference temperatures $RT_j$ is now determined for each of these second reference temperatures $RT_j$ from the second bright raw images $I_{k,j}$ and the second dark raw images $I_{0,j}$. The calculation of a quotient image $Q_j(n,m)=IK_{k,j}(n,m)/IK_k(n,m)$ from the second bright image $IK_{k,j}$ (dividend) and the first bright image $IK_k$ (divisor) belonging to the second dose setting $D_k$ subsequently ensues. These quotient images $Q_j$ are now stored together with the reference temperatures $T_j$ belonging to these.

As shown in FIG. 6, the first reference temperature RT is now initially measured for the actual generation of an x-ray image of an examination subject. For this current reference temperature RT, that reference temperature $RT_p$ whose difference is minimal relative to the current reference temperature RT is now selected from the memory. The quotient image $Q_p$ belonging to the selected reference temperature $RT_p$ (and therewith to the current reference temperature RT) is subsequently selected. Calibration images $K_{i,p}(n,m)=IK_i \times Q_p$ are now calculated from the first corrected bright raw images $IK_i$ and the quotient image $Q_p$ via multiplication L.

A dark raw image of an examination subject IK(n,m) is subsequently generated at this current reference temperature for offset compensation and a current offset-corrected bright image of said examination subject IK(n,m) is generated given a current dose setting D selected by the operator. With the aid of the previously-determined current calibration images $K_{i,p}(n,m)=IK_i \times Q_p$, the image data of the current offset-corrected bright images IK(n,m) are now corrected in the same manner as this occurred in the prior art with the standard calibration data set. The result is then a correction image $IK_{cor}(n,m)$ that is corrected corresponding to the current reference temperature.

The selection of the current calibration images $K_{i,p}(n,m)$ can also be made from the calibration image memory when the first offset-corrected bright images $IK_e$ generated given the individual dose settings $D=D_e$ are already multiplied with the quotient images $Q_j$ after the conclusion of the calibration procedure (FIG. 5) in order to generate a calibration image data set with $L \cdot K$ stored calibration images $K_{i,j}$ (corresponding to $L \times K \times n \times m$ stored sensitivity values of the individual detector elements) from L dose settings $D_1, \ldots, L$ and K reference temperatures $RT_1, \ldots, K$.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for calibrating an image-generated x-ray system, comprising a digital x-ray receiver that receives x-ray radiation emitted from an x-ray tube, comprising the steps of:
    (a) generating a first dark raw image at a first constant reference temperature of the x-ray receiver;
    (b) for each of a plurality of first dose settings of said x-ray tube at said first constant reference temperature, generating a first bright raw image;
    (c) automatically electronically determining a plurality of first offset-corrected bright images from the first dark raw image and the respective first bright raw images;
    (d) at each of a plurality of second reference temperatures, generating a second dark raw image;
    (e) for each of the second reference temperatures, generating a second bright raw image at a second dose setting of said x-ray tube that corresponds to one of said first dose settings;
    (f) for each of the second reference temperatures, automatically electronically determining an offset-corrected second bright image from the second dark raw image and the second bright raw image;
    (g) for each of the second reference temperatures, automatically electronically determining at least one quotient image from the offset-corrected second bright image and the first offset-corrected bright image for the second dose setting; and
    (h) storing the respective quotient images linked with the respective second reference temperatures used to determine the respective quotient images.

2. A method as claimed in claim 1 comprising generating said second dark raw images and said second bright images during a heating phase of said x-ray system.

3. A method as claimed in claim 1 comprising generating said first bright raw images and said second bright raw images as averaged bright raw images formed from a plurality of bright raw images, and generating said first and second dark raw images as averaged dark raw images formed from a plurality of dark raw images.

4. A method as claimed in claim 1 comprising multiplying each of the first offset-corrected bright images with each of the quotient images to produce a calibration image, and storing the calibration images.

5. A method for generating an x-ray image with an x-ray system, comprising a digital x-ray receiver that receives x-ray radiation from an x-ray tube, comprising the steps of:
    (a) generating a first dark raw image at a first constant reference temperature of the x-ray receiver;
    (b) for each of a plurality of first dose settings of said x-ray tube at said first constant reference temperature, generating a first bright raw image;
    (c) automatically electronically determining a plurality of first offset-corrected bright images from the first dark raw image and the respective first bright raw images;

(d) at each of a plurality of second reference temperatures, generating a second dark raw image;

(e) for each of the second reference temperatures, generating a second bright raw image at a second dose setting of said x-ray tube that corresponds to one of said first dose settings;

(f) for each of the second reference temperatures, automatically electronically determining an offset-corrected second bright image from the second dark raw image and the second bright raw image;

(g) for each of the second reference temperatures, automatically electronically determining at least one quotient image from the offset-corrected second bright image and the first offset-corrected bright image for the second dose setting;

(h) storing the respective quotient images linked with the respective second reference temperatures used to determine the respective quotient images.

(i) multiplying each of the first offset-corrected bright images with each of the quotient images to generate a plurality of respective calibration images, and storing the calibration images;

(j) determining a current reference temperature of the x-ray receiver;

(k) selecting a stored calibration image generated for a reference temperature corresponding to the current reference temperature;

(l) generating an offset-corrected bright image of an examination subject using a current dose setting of the x-ray tube at the current reference temperature; and (m) correcting the offset-corrected bright image of the examination subject using the selected calibration image, by multiplying the first offset-corrected bright image with the stored quotient image linked to a reference temperature corresponding to the current reference temperature.

6. A method for generating an x-ray image with an x-ray system comprising an x-ray receiver that receives x-ray radiation emitted by an x-ray tube, comprising the steps of:

(a) generating a first dark raw image at a first constant reference temperature of the x-ray receiver;

(b) for each of a plurality of first dose settings of said x-ray tube at said first constant reference temperature, generating a first bright raw image;

(c) automatically electronically determining a plurality of first offset-corrected bright images from the first dark raw image and the respective first bright raw images;

(d) at each of a plurality of second reference temperatures, generating a second dark raw image;

(e) for each of the second reference temperatures, generating a second bright raw image at a second dose setting of said x-ray tube that corresponds to one of said first dose settings;

(f) for each of the second reference temperatures, automatically electronically determining an offset-corrected second bright image from the second dark raw image and the second bright raw image;

(g) for each of the second reference temperatures, automatically electronically determining at least one quotient image from the offset-corrected second bright image and the first offset-corrected bright image for the second dose setting;

(h) storing the respective quotient images linked with the respective second reference temperatures used to determine the respective quotient images;

(i) determining a current reference temperature of said x-ray receiver;

(j) selecting a stored quotient image produced at a reference temperature corresponding to the current reference temperature;

(k) generating an offset-corrected bright image of an examination subject for a current dose setting of the x-ray tube at the current reference temperature; and (l) correcting the offset-corrected bright image of the examination subject with a calibration image generated by multiplying the first offset-corrected bright image with the selected quotient image.

7. An x-ray system comprising:

an x-ray tube that irradiates a subject with x-ray radiation;

a digital x-ray receiver that receives x-ray radiation from the x-ray tube; and a control unit that operates said x-ray tube and said x-ray receiver to (a) generate a first dark raw image at a first constant reference temperature of the x-ray receiver; (b) for each of a plurality of first dose settings of said x-ray tube at said first constant reference temperature, generate a first bright raw image; (c) automatically determine a plurality of first offset-corrected bright images from the first dark raw image and the respective first bright raw images; (d) at each of a plurality of second reference temperatures, generate a second dark raw image; (e) for each of the second reference temperatures, generate a second bright raw image at a second dose setting of said x-ray tube that corresponds to one of said first dose settings; (f) for each of the second reference temperatures, automatically determine an offset-corrected second bright image from the second dark raw image and the second bright raw image; (g) for each of the second reference temperatures, automatically determine at least one quotient image from the offset-corrected second bright image and the first offset-corrected bright image for the second dose setting; (h) store the respective quotient images linked with the respective second reference temperatures used to determine the respective quotient images; (i) multiply each of the first offset-corrected bright images with each of the quotient images to generate a plurality of respective calibration images, and store the calibration images; (j) determine a current reference temperature of the x-ray receiver; (k) select a stored calibration image generated for a reference temperature corresponding to the current reference temperature; (l) generate an offset-corrected bright image of the subject using a current dose setting of the x-ray tube at the current reference temperature; and (m) correct the offset-corrected bright image of the subject using the selected calibration image, by multiplying the first offset-corrected bright image with the stored quotient image linked to a reference temperature corresponding to the current reference temperature.

8. An x-ray system comprising:

an x-ray tube that irradiates a subject with x-ray radiation;

an x-ray receiver that receives x-ray radiation emitted by the x-ray tube;

a control unit that operates said x-ray tube and said x-ray receiver to (a) generate a first dark raw image at a first constant reference temperature of the x-ray receiver; (b) for each of a plurality of first dose settings of said x-ray tube at said first constant reference temperature, generate a first bright raw image; (c) automatically determine a plurality of first offset-corrected bright images from the first dark raw image and the respective first bright raw images; (d) at each of a plurality of second reference temperatures, generate a second dark raw image; (e) for each of the second reference temperatures, generate a second bright raw image at a second dose setting of said x-ray tube that corresponds to one of said first dose settings; (f) for each of the second reference temperatures, automatically determine an offset-corrected second bright image from the second dark raw image and the second bright raw image; (g) for each of the second reference temperatures, automatically determine at least one quotient image from the offset-corrected second bright image and the first offset-corrected bright image for the second dose setting; (h) store the respective quotient images linked with the respective second reference temperatures used to determine the respective quotient images; (i) determine a current reference temperature of said x-ray receiver; (j) select a stored quotient image produced at a reference temperature corresponding to the current reference temperature; (k) generate an offset-corrected bright image of the subject for a current dose setting of the x-ray tube at the current reference temperature; and (l) correct the offset-corrected bright image of the subject with a calibration image generated by multiplying the first offset-corrected bright image with the selected quotient image.

* * * * *